United States Patent [19]
Wheelock

[11] 3,829,106
[45] Aug. 13, 1974

[54] HIGH PRESSURE LIP SEAL

[75] Inventor: Edward A. Wheelock, Lake Zurich, Ill.

[73] Assignee: Crane Packing Company, Morton Grove, Ill.

[22] Filed: Dec. 4, 1972

[21] Appl. No.: 311,853

[52] U.S. Cl. .............................. 277/205, 308/36.1
[51] Int. Cl. ............................................ F16j 15/32
[58] Field of Search............ 308/36.1, 187.1, 187.2; 277/205, 206, 207, 208

[56] References Cited
UNITED STATES PATENTS
2,593,410   4/1952   Bockendale .................. 308/36.1
2,891,827   6/1959   Butkus .............................. 277/205

Primary Examiner—Louis R. Prince
Assistant Examiner—Robert I. Smith
Attorney, Agent, or Firm—Charles F. Voytech

[57] ABSTRACT

The invention disclosed is a simple elastomeric ring used as a seal between a rotating shaft and a housing, said shaft and housing forming parts of a high pressure hydraulic system. The ring is shaped to have a flexible lip exposed to the fluid under pressure and held against the shaft by said fluid, and to form a groove adjacent the shaft, the groove being filled with a lubricant. Pressure to 2,500 p.s.i. can be taken by the ring so that the ring can in some instances replace high cost end face rotary mechanical seals normally used for such pressures.

6 Claims, 2 Drawing Figures

PATENTED AUG 13 1974　　3,829,106

HIGH PRESSURE LIP SEAL

This invention relates to sealing rings for rotating or oscillating shafts forming parts of hydraulic systems developing pressures up to 2,500 p.s.i., and particularly to such rings made of an elastomer and having a lip exposed to the hydraulic pressure, which lip is held against the shaft by said pressure.

Elastomeric rings having pressure-responsive lips have been known for many years as seals for bearings. Examples of such rings are those disclosed in U.S. Pat. Nos. 3,158,736 to Rentschler, dated Nov. 24, 1964; 3,173,698 to Haberhorn dated Mar. 16, 1965 and 3,189,359 to Haberston dated June 15, 1965. In all such prior rings, the pressure-responsive lips create so much friction that the rings are not recommended for high pressures. Accordingly, rotary mechanical end face seals costing one hundred times as much have been resorted to provide a satisfactory seal.

It is an object of this invention to provide a simple inexpensive pressure-responsive lip-type seal for high pressure applications on the order of 2,500 p.s.i.

As a more specific object, this invention seeks to provide a ring of molded deformable material having an integral lip facing the pressure fluid to be sealed, and having formed in its inner surface facing a shaft passing therethrough a groove which may be filled with a lubricant to reduce the friction between the ring and the shaft encircled thereby and against which it is designed to seal.

Another object of this invention is to provide a simple inexpensive sealing ring for high pressure fluid application which is small enough to fit into a groove designed to receive an "O" ring capable of sealing like pressures.

These and other objects will become apparent from the following detailed description of a preferred embodiment of the invention when taken together with the accompanying drawings in which.

Figure 1:
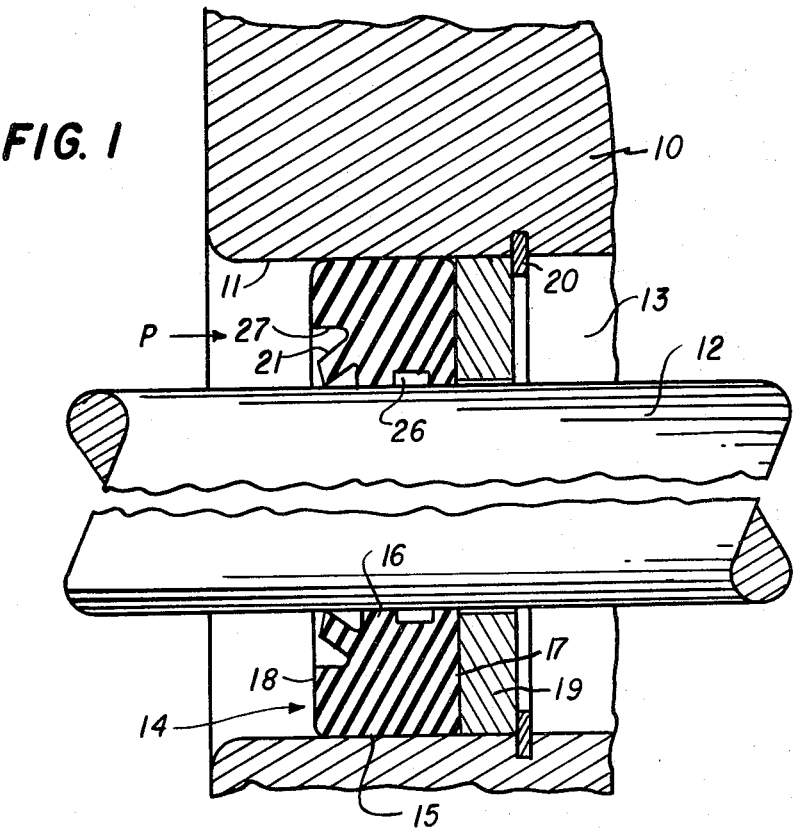
FIG. 1 is an enlarged section through a housing and seal showing the seal in its installed condition.

In the form selected to illustrate this invention the ring is a torus of elastomeric material having a 90 Durometer hardness and formed with a substantially rectangular radial cross section. The outer cylindrical surface of the ring engages the cylindrical surface of a machine element such as a housing, and the inner cylindrical surface which is disposed at one end of said ring may have a loose engagement with another machine element such as a shaft. Said elements may oscillate relative to an one another as in a steering mechanism, or they may rotate as in a gear mechanism. At the other end of the torus is formed integrally therewith a frusto-conical lip having a thickness of approximately one-fourth the usual length of the torus and terminating in a knife edge bearing upon the aforementioned other machine element. The lip faces the fluid under pressure to be sealed and is held in contact with said other machine element by said fluid. A groove is formed in the inner cylindrical surface of the ring in which is packed a semisolid lubricant such as a grease made of a mixture of polytetrafluoroethylene powder and silicone. A back-up ring, preferably of metal, is used to hold the sealing ring from moving axially.

Referring now to the drawings for a detailed description of the invention, a fragment of a housing is shown at 10 in which is formed an opening 11 of circular form. A shaft 12 passes through opening 11 and is of smaller diameter than opening 11 to leave a toroidal chamber 13 in which may be disposed a bearing (not shown) for supporting shaft 12 in opening 11.

Housing 10 may have any appropriate shape for the use to which it is to be put and may be designed to hold fluid under pressure up to 2,500 p.s.i. For purposes of illustration it will be assumed that the fluid under pressure will be on the left hand side of housing 10 as viewed in FIG. 1. Said fluid is held from passing through chamber 13 by the seal of this invention which is shown in radial cross section at 14 and is comprised of an endless ring of elastomeric material having a durometer hardness of approximately 90.

Sealing ring 14, in the form selected to illustrate this invention, is rectangular in radial cross section and may in fact be square. Thus it has a cylindrical outer surface 15, a cylindrical inner surface 16 and substantially parallel, radially disposed sides 17 and 18. Side 17 bears against a rigid metal back-up ring 19 which may also be rectangular in radial cross section and extends radially inwardly in support of ring 14 against axially directed pressure from the fluid sealed by said ring. A snap ring 20 serves to locate and hold back-up ring 19 in chamber 13.

Figure 2:
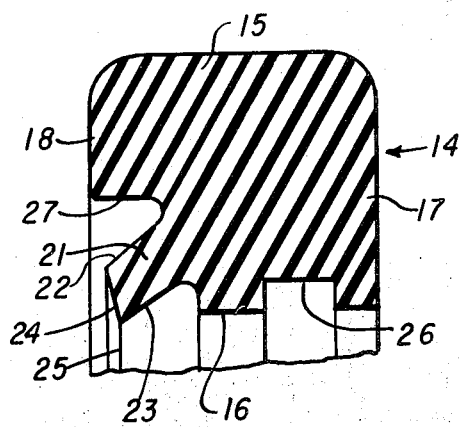
FIG. 2 is a still further enlarged radial cross section through the sealing ring of FIG. 1.

Pressure side 18 of ring 14 has formed therein a lip 21 which is defined by outer and inner frusto-conical surfaces 22 and 23 (FIG. 2) and by an end frusto-conical surface 24. Surfaces 23 and 24 intersect to form a relatively sharp circular edge 25 the diameter of which is less than the diameter of shaft 12, such that lip 21 is preloaded upon shaft 12 when ring 14 is initially installed over said shaft, to provide a fluid-tight seal between housing 10 and shaft 12 independently of the pressure in the fluid being sealed.

The cone angle of surface 22 relative to the axis of shaft 12 is approximately 5° greater than the corresponding cone angle of surface 23 to provide uniform stress in the lip 21 along its length to prevent its collapse under working pressure. It may be apparent that surface 22 is subjected to the full pressure of the fluid being sealed and that a radially inward component of the fluid pressure is created in surface 22 tending to collapse lip 21 against shaft 12. The radially outward pressure on surface 23 to counteract the fluid pressure in the inward direction is only atmospheric and hence lip 21 must be thicker at its base than at its free end to prevent collapse of the lip as aforesaid.

End surface 24 may have a 10° slope from a radial plane, the angle being increased as desired to provide a predetermined fluid pressure balance with respect to the pressure on surface 22, and thus to decrease the radially inwardly directed force on edge 25 and shaft 12.

A circumferentially directed groove 26 is formed in inner surface 16, said groove in the illustrated example being approximately one-tenth the radial dimension of ring 14 in depth and approximately one-fourth the axial dimension of the ring in width. The groove is located approximately one-sixth of the axial width of the ring 14 from side 17 thereof. The purpose of groove 26 is to hold a viscous lubricant comprised of a silicone grease and a filler such as powdered polytetrafluoroethylene which finds its way along shaft 12 under inner surface 16 and edge 25 to reduce friction and wear of said surface 16 and edge 25. This lubricant can withstand high temperature up to 450° F. and serves to reduce both starting and running torque. Such lubricants are commercially available from Dow Corning Corporation under the name of "Fluorosilicone Greases". (Bulletin 71–025 dated 5/71).

When the seal is installed as illustrated in FIG. 1, running edge 25 of lip 21 is held against shaft 12 by the radially inward component of the pressure of the fluid sealed, and this component increases with the pressure. The net component depends upon the amount of balancing force developed by the fluid pressure acting upon surface 24.

In the form illustrated, lip 21 is disposed in a recess 27 formed adjacent shaft 12 in side 18 of ring 14. The lip may also be formed if desired exterior to, but integral with, the ring 14 to dispense with the need for forming recess 27.

Ring 14 can be made of a deformable material other than an elastomer, such as polytetrafluoroethylene or other plastic, if operating conditions of temperature and compatability with the fluid sealed so dictate. It can also be used in steering mechanisms where oscillating motion between housing 10 and and shaft 12 predominates, or it can be installed around rotating shafts.

In addition to its simplicity, ease of installation and small space requirements as compared to a rotary mechanical seal, ring 14 can be produced for about one-tenth to one-one hundredth of the cost of a rotary mechanical seal of equivalent fluid pressure capabilities.

It is understood that the foregoing description is merely illustrative of a preferred embodiment of the invention and that the scope of the invention therefore is not to be limited thereto but is to be determined by the appended claims.

I claim:

1. A ring for effecting a fluid-tight seal between radially spaced concentric cylindrical surfaces on relatively rotatable machine elements, said ring comprising a torus of moldable flexible material adapted to be inserted into the annular spaced formed by said machine element surfaces and having one radially disposed side facing the fluid to be sealed and one cylindrical side facing said machine element cylindrical surface, a radially inwardly sloping lip extending from the corner region formed by said sides of the torus said lip having a lesser inside diameter than the torus, of the cylindrical surface of said one of said machine elements and formed with substantially a knife edge in contact with said cylindrical surface of one of said machine elements, said side of the torus facing one of said machine elements having a circumferential groove formed therein, and a paste-like lubricant in said groove.

2. A ring as described in claim 1, said ring having a recess formed in the region thereof bounded by the side facing the pressure and the side facing said one of said machine elements, and said lip being disposed in said recess.

3. A ring as described in claim 1, said knife edge in the lip being formed by the intersection of the inner surface of the lip and a radially outwardly sloping surface forming the inner end of the lip, said latter outwardly sloping surface providing a radially outwardly directed component of force of the fluid under pressure upon the knife edge tending to reduce the total radially inwardly directed force upon said lip and thereby reducing friction between said lip and said one machine element.

4. A ring as described in claim 1, said lip having a transverse thickness substantially equal to one-fourth of the radial dimension of the space between the said relatively rotatable elements.

5. A ring as described in claim 1, said ring having a generally rectangular radial cross section, the material of said ring being an elastomer of approximately 90 durometer hardness and said lubricant being a mixture of polytetrafluoroethylene particles and a viscous silicone vehicle.

6. A ring as described in claim 1, said ring having a generally rectangular radial cross section with a substantially rectangular recess formed in the inner corner thereof facing the fluid under pressure, and said lip extending from a radially disposed surface of said recess.

* * * * *

PO-1050
(5/69)

Patent No. 3,829,106    Dated August 13, 1974

Inventor(s)    Edward A. Wheelock

It is certified that error appears in the above-identified patent and that said Letters Patent are hereby corrected as shown below:

In the Claims:

Col. 4, line 6: change "torus" to -- diameter --.

Signed and sealed this 19th day of November 1974.

(SEAL)
Attest:

McCOY M. GIBSON JR.             C. MARSHALL DANN
Attesting Officer               Commissioner of Patents